G. HART.
Improvement in Nut-Locks.
No. 128,391.  Patented June 25, 1872.
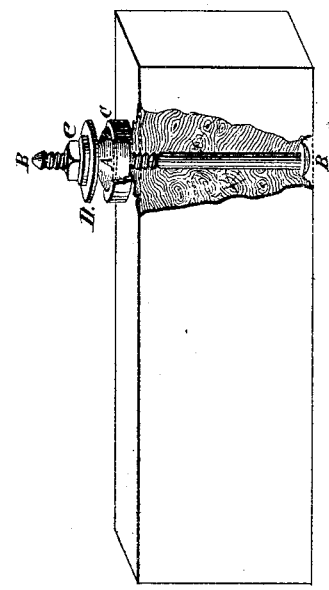
WITNESSES:
Jno. D. Patten.
W. T. Hutchinson
INVENTOR:
George Hart
By J. J. Johnston & Bro
his attorneys

UNITED STATES PATENT OFFICE.

GEORGE HART, OF COLUMBIANA, OHIO.

IMPROVEMENT IN NUT-LOCKS.

Specification forming part of Letters Patent No. 128,391, dated June 25, 1872.

*To all whom it may concern:*

Be it known that I, GEORGE HART, of Columbiana, in the county of Columbiana and State of Ohio, have invented a new and useful Improvement in "Lock-Nuts;" and I do hereby declare that the following is a full, clear, and exact description thereof, reference being had to the accompanying drawing and letters of reference marked thereon.

The nature of my invention consists in interposing between the nut and an ordinary iron washer on a bolt, and the article or thing through which the bolt passes, an elastic washer, with its outer face convexed and its periphery surrounded with a metallic band.

To enable others skilled in the art to make and use my invention, I will proceed to describe more fully its construction and operation.

In the accompanying drawing, which forms part of my specification, A represents a gum washer, the outer face of which is convexed, and its periphery is surrounded with a metal ring or band, C. In the center of the washer is an opening, through which the bolt B passes. D represents a metal washer, which is placed between the gum washer A and the nut e, to prevent the convexed face of the gum washer from injury during the operation of screwing the nut e upon the bolt B. By interposing, between nut e and the article or thing through which the bolt passes, a washer constructed of gum and provided with a convex face, and banded with metal, the nut will be held firmly and securely to its place. The convexed face of the washer enables the operator to determine the degree of hold the washer shall have upon the nut and article or thing upon which it rests. The convexed face of the gum washer A with its band C, when subjected to pressure through the medium of the iron washer D and nut e, will cause the gum washer A to impinge with great force upon the bolt B, and at the same time have an outward pressure against the iron washer D and nut e, whereby the bolt B and nut e are prevented from turning. The interposition of the ordinary iron washer D between the gum washer A and the nut e prevents the nut from wearing and injuring the convexed face of the gum washer A.

I wish it clearly understood that I do not claim, broadly, a gum washer, nor do I claim such washer or washers in combination with a bolt and nut.

What I claim as of my invention is—

A gum washer provided with a convexed face, and its periphery surrounded with a metal band, in combination with the ordinary iron washer, bolt, and nut, as herein described, and for the purpose set forth.

GEORGE HART.

Witnesses:
    A. C. JOHNSTON,
    JAMES J. JOHNSTON.